United States Patent
Inoue et al.

(10) Patent No.: US 7,934,837 B2
(45) Date of Patent: May 3, 2011

(54) PROJECTION DISPLAY DEVICE

(75) Inventors: Masutaka Inoue, Hirakata (JP);
Takaaki Abe, Osaka (JP); Seiji Tsuchiya, Otsu (JP)

(73) Assignee: Sanyo Electric Co., Ltd., Osaka (JP)

( * ) Notice: Subject to any disclaimer, the term of this patent is extended or adjusted under 35 U.S.C. 154(b) by 322 days.

(21) Appl. No.: 12/239,551

(22) Filed: Sep. 26, 2008

(65) Prior Publication Data

US 2009/0086111 A1 Apr. 2, 2009

(30) Foreign Application Priority Data

Sep. 28, 2007 (JP) ................................. 2007-255885
Aug. 8, 2008 (JP) ................................. 2008-205319

(51) Int. Cl.
*G03B 21/14* (2006.01)
(52) U.S. Cl. .................... 353/31; 353/34; 353/84; 349/8
(58) Field of Classification Search .................... 353/31, 353/33, 34, 37, 84, 20, 97; 349/5, 7, 8, 9
See application file for complete search history.

(56) References Cited

U.S. PATENT DOCUMENTS

| | | | | |
|---|---|---|---|---|
| 6,747,708 B2 * | 6/2004 | Taniai et al. | ................... | 348/761 |
| 6,905,216 B2 * | 6/2005 | Stanton et al. | ................... | 353/84 |
| 6,962,415 B2 * | 11/2005 | Dubin et al. | ..................... | 353/20 |
| 7,131,735 B2 * | 11/2006 | Yokoyama | ...................... | 353/98 |
| 7,226,172 B2 * | 6/2007 | Robinson | ....................... | 353/97 |
| 2001/0052947 A1 | 12/2001 | Taniai et al. | | |
| 2006/0092346 A1 | 5/2006 | Moon et al. | | |
| 2009/0015796 A1 * | 1/2009 | Maeda et al. | ................... | 353/20 |

FOREIGN PATENT DOCUMENTS

| | | |
|---|---|---|
| JP | 2000-510961 | 8/2000 |
| JP | 2001-346219 | 12/2001 |
| JP | 2006-128125 | 5/2006 |
| WO | WO97/43862 | 11/1997 |

* cited by examiner

*Primary Examiner* — William C Dowling
(74) *Attorney, Agent, or Firm* — NDQ&M Watchstone LLP

(57) ABSTRACT

In a projection display device which includes a light source for outputting a light and a plurality of light modulating devices for modulating the light from the light source based on an input image signal, the projection display device comprises: a plurality of light quantity adjusting devices disposed on respective incidence sides of the light modulating devices and serving to adjust the quantity of light incident on the respective light modulating devices; and a controller unit for controlling the respective light quantity adjusting devices based on the input image signal.

11 Claims, 13 Drawing Sheets

FIG. 5
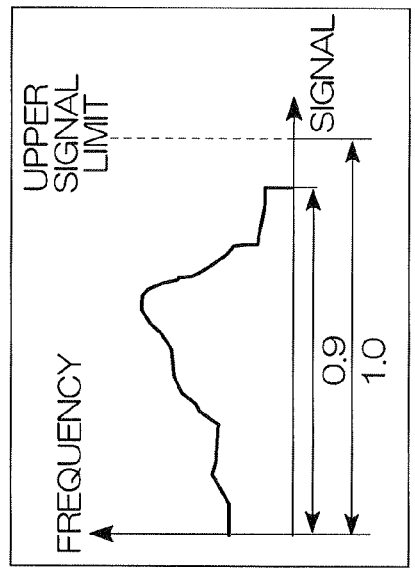
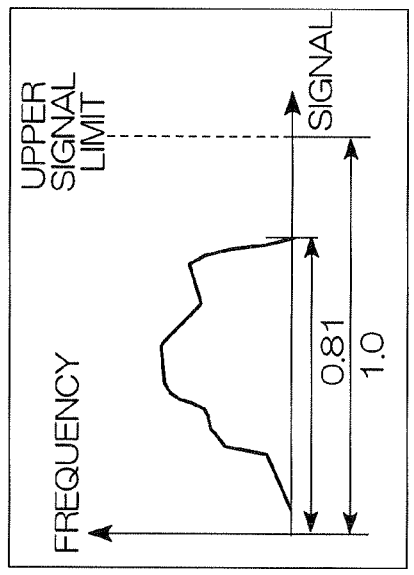
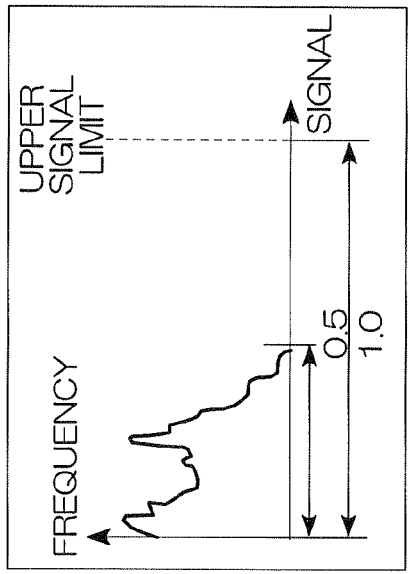
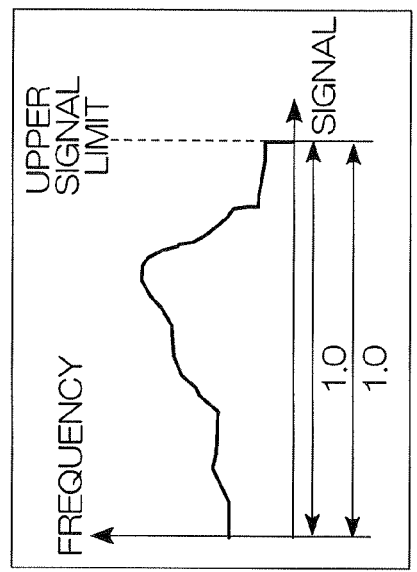
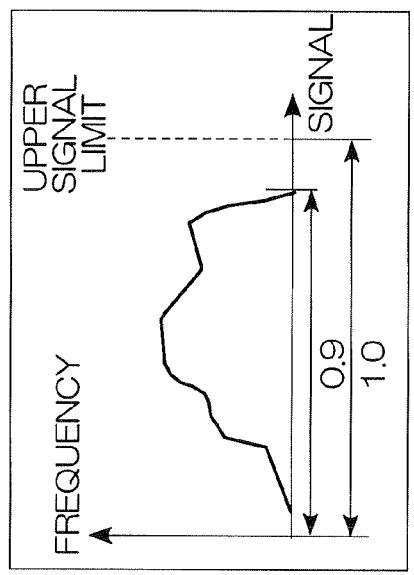
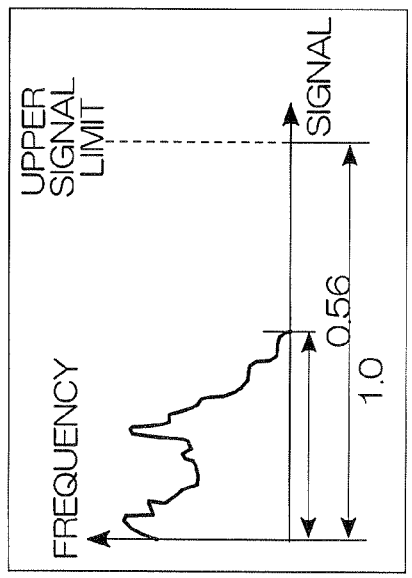

PROJECTION DISPLAY DEVICE

BACKGROUND OF THE INVENTION

1. Technical Field

The present invention relates to a projection display device such as a projector.

2. Prior Arts

The projection display device needs to further enhance the contrast of a projected image because the projected image is significantly affected by projection environments.

A single panel projector employing a color switch is disclosed in Japanese Unexamined Patent Publication No. 2001-346219. The projector achieves the enhanced image contrast by taking a procedure of calculating an average luminance of input image signals and controlling the transmittance of the color switch based on the resultant average luminance. This prior-art technique has the following problem. Since the transmittance of the color switch is controlled based on the average luminance of the input image signals, the maximum luminance cannot be attained as the result of the rounding operation. In addition, this prior-art technique is limited to the single panel projector.

On the other hand, a technique of using plural light emitting diodes (LED) as a backlight of a liquid crystal display is disclosed in Japanese Unexamined Patent Publication No. 2006-128125. This prior-art technique offers effective means for enhancing the contrast of image on a direct-view LED display. However, plural light sources are necessary for adapting this technique to the projector, resulting in the increase of cost and size of the display. It is impracticable to apply this technique to the display.

SUMMARY OF THE INVENTION

The invention is directed to a projection display device adapted to achieve cost reduction and to enhance image contrast.

In accordance with a first aspect of the invention, a projection display device which includes a light source for outputting light, and a plurality of light modulating devices for modulating the light from the light source based on an input image signal, comprises: a plurality of light quantity adjusting devices disposed on respective incidence sides of the light modulating devices and serving to adjust the quantity of light incident on the respective light modulating devices; and a controller unit for controlling the respective light quantity adjusting devices based on the input image signal.

The projection display device may further comprise a signal correction unit for correcting a signal outputted to the light modulating device in a manner to compensate for the decrease of light quantity attributable to the light quantity adjusting device.

The projection display device may have an arrangement wherein each of the light quantity adjusting devices is divided into plural blocks and the light quantity is adjusted for each display region of the light modulating device that corresponds to each of the blocks.

The light source may include, for example, a red laser light source for outputting a red laser light, a green laser light source for outputting a green laser light, and a blue laser light source for outputting a blue laser light.

Each of the light modulating devices may be a reflective light modulating device which outputs a modulated light as a reflective light.

In a projection display device which includes a light source for outputting a white light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, and in which any one of the first-color light, the second-color light and the third-color light is superimposed with a fourth-color light and is made incident on a corresponding one of the first-color light modulating device, the second-color light modulating device and the third-color light modulating device, the projection display device in accordance with a second aspect of the invention comprises: a light quantity adjusting device disposed on an incidence side of the light modulating device for the fourth-color light to enter and serving to adjust the quantity of the fourth-color light; and a controller unit for controlling the light quantity adjusting device, and is characterized in that the controller unit performs calculation on a per-frame basis for determining, as an error ratio, a ratio of pixels outside a color gamut provided when the quantity of the fourth-color light is not limited, and controls the light quantity adjusting device based on the error ratio thus determined.

If the error ratio is less than a predetermined threshold value, for example, the controller unit controls the light quantity adjusting device in a manner not to decrease the quantity of the fourth-color light.

If the error ratio is not less than the predetermined threshold value, for example, the controller unit controls the light quantity adjusting device in a manner that the quantity of the fourth-color light is decreased more with the increase of the error ratio.

BRIEF DESCRIPTION OF THE DRAWINGS

FIG. 5 is a group of graphs showing exemplary histograms respectively plotting the values of R, G, B signals in one frame and respectively plotting the signal values corrected by an image signal correction unit;

DETAILED DESCRIPTION OF PREFERRED EMBODIMENTS

Referring to the accompanying drawings, the following description is made on embodiments where the invention is applied to a liquid crystal projector.

[1] First Embodiment

[1.1] General Configuration of Liquid Crystal Projector

Figure 1:
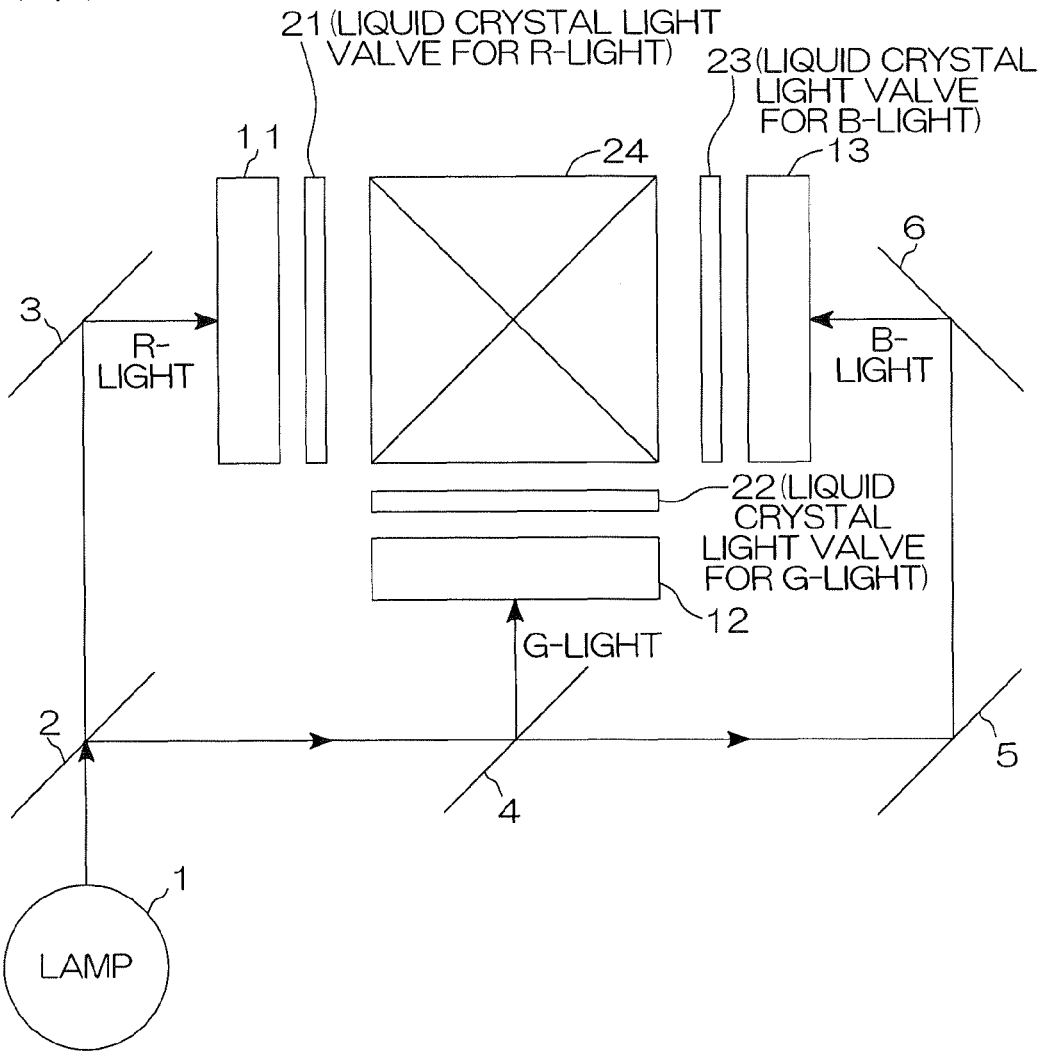
FIG. 1 is a schematic diagram showing a general configuration of a liquid crystal projector.

FIG. 1 schematically shows a general configuration of a liquid crystal projector.

A lamp 1 as a light source may be a metal halide lamp, a high pressure mercury lamp or the like. The projector comprises liquid crystal light valves which include a liquid crystal light valve for red(R)-light 21, a liquid crystal light valve for green(G)-light 22 and a liquid crystal light valve for blue(B)-light 23. The liquid crystal light valves 21, 22, 23 each comprise a liquid crystal panel, an incident-side polarizer disposed on an incidence side of the liquid crystal panel, and an output-side polarizer disposed on an output side of the liquid crystal panel.

The liquid crystal light valves 21, 22, 23 are respectively provided with light quantity adjusting devices 11, 12, 13 on the incidence sides thereof. The light quantity adjusting devices 11, 12, 13 each comprise a wavelength-selective polarization changing device. The wavelength-selective polarization changing device means a device capable of exclusively rotating the polarization of light in an optional wavelength region.

The R-light quantity adjusting device 11 on the incidence side of the liquid crystal light valve for R-light 21 is capable of exclusively rotating the polarization of light in a red wavelength region. The G-light quantity adjusting device 12 on the incidence side of the liquid crystal light valve for G-light 22 is capable of exclusively rotating the polarization of light in a green wavelength region. The B-light quantity adjusting device 13 on the incidence side of the liquid crystal light valve for B-light 23 is capable of exclusively rotating the polarization of light in a blue wavelength region. The light quantity adjusting devices 11, 12, 13 are each used in combination with the incident-side polarizer of the corresponding one of the liquid crystal light valves 21, 22, 23, thereby being capable of changing the quantity of light in the wavelength region of the corresponding color. If the light quantity adjusting device comprises the wavelength-selective polarization changing device, the light quantity adjusting device is adapted for exclusively rotating the polarization of light in a particular wavelength region, accomplishing both the control of light quantity and the control of phase at a time. It is also possible to improve color purity.

Figure 2:
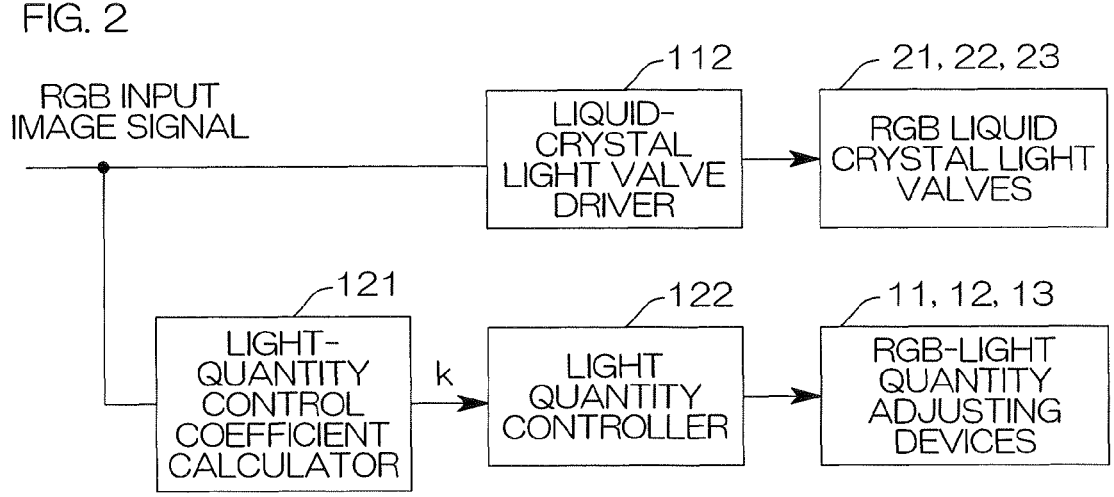
FIG. 2 is a block diagram showing a driving circuit of liquid crystal light valves and a control circuit of light quantity adjusting devices.

The wavelength-selective polarization changing device used as the light quantity adjusting device 11, 12, 13 may be exemplified by a filter disclosed in FIG. 2 of Published Japanese Translation of PCT International Publication for Japanese Patent Application No. 2000-510961, for example. This filter comprises a first retarder stack, a modulator (liquid crystal display) and a second retarder stack. The filter permits the polarization of light in an optional wavelength region to be rotated in the range of 0 to 90° by varying the voltage applied to the modulator. After the rotation of the polarization of light in the optional wavelength region, the polarized light is incident on the incident-side polarizer in the liquid crystal light valve on the rear side, whereby the quantity of light is controlled.

A white light outputted from the lamp 1 is guided to a first dichroic mirror 2 via unillustrated integrator lens, polarization changer (polarizing beam splitter array) and collective lens. The first dichroic mirror 2 is transparent to light in a red wavelength band but reflects light in a cyan (green+blue) wavelength band. Passing through the first dichroic mirror 2, the light in the red wavelength band is guided to the liquid crystal light valve for R-light 21 via a reflective mirror 3 and the R-light quantity adjusting device 11.

As reflected by the first dichroic mirror 2, the light in the cyan wavelength band is guided to a second dichroic mirror 4. The second dichroic mirror 4 is transparent to light in a blue wavelength band but reflects light in a green wavelength band. As reflected by the second dichroic mirror 4, the light in the green wavelength band is guided to the liquid crystal light valve for G-light 22 via the G-light quantity adjusting device 12. Passing through the second dichroic mirror 4, the light in the blue wavelength band is guided to the liquid crystal light valve for B-light 23 via reflective mirrors 5, 6 and the B-light quantity adjusting device 13.

The light beams guided to the respective liquid crystal light valves 21, 22, 23 are modulated as passing through the light valves. The light beams modulated as passing through the respective liquid crystal light valves (modulated image light beams of the respective colors) are combined into a modulated color image light by means of a dichroic prism 24. The modulated color image light is magnified and projected on a screen by an unillustrated projection lens.

[1.2] First Example of Driving System and Control System

FIG. 2 shows a driving circuit of the liquid crystal light valves and a control circuit of the light quantity adjusting devices.

An RGB input image signal is supplied to a liquid-crystal light valve driver 112 as well as to a light-quantity control coefficient calculator 121. The liquid-crystal light valve driver 112 generates respective driving signals for the liquid crystal light valves 21, 22, 23 based on the R, G, B input image signals and outputs the resultant signals to the respective liquid crystal light valves 21, 22, 23.

The light-quantity control coefficient calculator 121 calculates a light-quantity control coefficient k based on the RGB input image signal. The light-quantity control coefficient k so determined by the light-quantity control coefficient calculator 121 is supplied to a light quantity controller 122. The light quantity controller 122 controls the respective light quantity adjusting devices 11, 12, 13 for increasing the quantity of light passing through each of the light quantity adjusting devices 11, 12, 13 by k time the quantity of incident light.

The light-quantity control coefficient calculator 121 calculates the light-quantity control coefficient k using the following first method or second method.

[1.2.1] First Method

According to the first method, the light-quantity control coefficient calculator 121 first detects the respective maximum values Rmax, Gmax, Bmax of the R, G, B input image signals on a per frame basis. The light-quantity control coefficient k is determined by dividing the maximum value MAX {Rmax, Gmax, Bmax} of the maximum signal values by the maximum value that the signal can take (upper signal limit: 255, for example).

Figure 3:
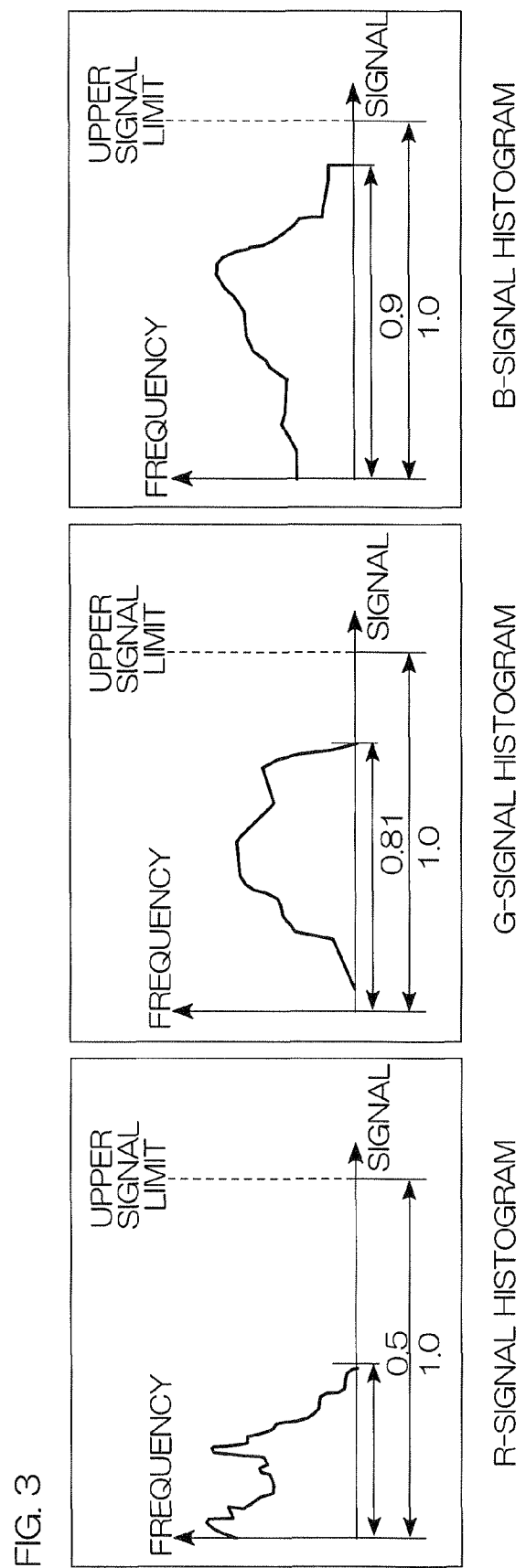
FIG. 3 is a group of graphs showing exemplary histograms respectively plotting the values of R, G, B signals in one frame.

A case is assumed, for example, where histograms respectively plotting the values of R, G, B signals in one frame are obtained as shown in FIG. 3. In FIG. 3, the signal values are normalized so as to provide the upper signal limit of "1.0". In this case, MAX {Rmax, Gmax, Bmax}/Upper signal limit=0.9. Hence, the light-quantity control coefficient k has a value of 0.9.

The light quantity controller 122 controls the respective light quantity adjusting devices 11, 12, 13 for increasing the quantity of light passing through each of the light quantity adjusting devices 11, 12, 13 to k time the quantity of the incident light. In the above example, the respective light quantity adjusting devices 11, 12, 13 are controlled in a manner that the quantity of light passing through each of the light quantity adjusting devices 11, 12, 13 is 0.9 times the quantity of the incident light. Hence, the quantity of light passing through the respective light quantity adjusting devices 11, 12, 13 is decreased. This method provides a higher image contrast because the quantity of incident light on each of the liquid crystal light valves 21, 22, 23 is decreased when a dark scene is projected.

[1.2.2] Second Method

According to the second method, the light-quantity control coefficient calculator 121 first generates, from the R, G, B input image signals, the histograms respectively plotting the values of R, G, B signals in one frame, as shown in FIG. 3. In this process, the values of the respective R, G, B signals are normalized to provide the upper signal limit of "1.0".

Subsequently, respective signal values (normalized signal values) $R_{95}$, $G_{95}$, $B_{95}$ are extracted from the respective histograms for the R, G, B signal values, the normalized signal value corresponding to the N-th pixel from one having the smallest signal value (N representing a value equivalent to 95% of the total pixel number). The maximum value MAX {$R_{95}$, $G_{95}$, $B_{95}$} of the extracted signal values is determined as the light-quantity control coefficient k. The reason why the light-quantity control coefficient k is determined based on the values of the R, G, B signals respectively corresponding to the N-th pixel from the one having the smallest signal value (N representing the value equivalent to 95% of the total pixel number) is as follows. In a case where the light-quantity control coefficient k is defined by the maximum value of the R, G, B signal values (the maximum value of the normalized signal values), the control of light quantity is disabled if any one of the R, G, B signals has a normalized value of 1.0. This may lead to a reduced chance to control the light quantity.

[1.3] Second Example of Driving System and Control System

In a second example of the driving system and control system, the driving circuit of the liquid crystal light valves differs from that of the first example of the driving system and control system.

Figure 4:
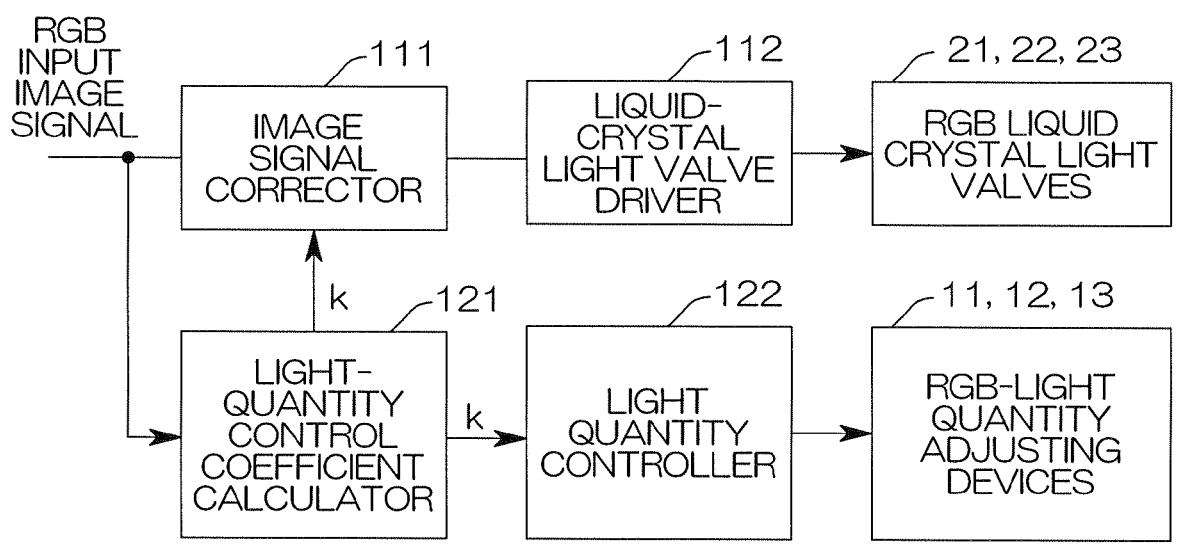
FIG. 4 is a block diagram showing a driving circuit of liquid crystal light valves and a control circuit of light quantity adjusting devices.

FIG. 4 shows the driving circuit of the liquid crystal light valves and the control circuit of the light quantity adjusting devices.

The RGB input image signal is supplied to an image signal corrector 111 as well as to the light-quantity control coefficient calculator 121.

The light-quantity control coefficient calculator 121 calculates the light-quantity control coefficient k using the above-described first method [1.2.1] or second method [1.2.2]. The light-quantity control coefficient k so determined by the light-quantity control coefficient calculator 121 is supplied to the light quantity controller 122. The light quantity controller 122 controls the respective light quantity adjusting devices 11, 12, 13 for increasing the quantity of light passing through each of the light quantity adjusting devices 11, 12, 13 to k time the quantity of the incident light.

The light-quantity control coefficient k so determined by the light-quantity control coefficient calculator 121 is also supplied to the image signal corrector 111. The image signal corrector 111 corrects the input image signal by multiplying each of the R, G, B input image signals by the reciprocal 1/k of the coefficient k. The R, G, B image signals thus corrected by the image signal corrector 111 are supplied to the liquid-crystal light valve driver 112. Based on the R, G, B image signals corrected by the image signal corrector 111, the liquid-crystal light valve driver 112 generates driving signals for the respective liquid crystal light valves 21, 22, 23. The resultant driving signals are outputted to the respective liquid crystal light valves 21, 22, 23. The decreased light quantities attributable to the light quantity adjusting devices 11, 12, 13 can be compensated for by correcting the input image signal. Therefore, the quantities of light incident on the respective liquid crystal light valves 21, 22, 23 can be reduced without affecting the quality of the projected image. Accordingly, the liquid crystal light valves 21, 22, 23 can be extended in service life.

A case is assumed, for example, where histograms respectively plotting the values of R, G, B signals in one frame are obtained as shown in the upper row of FIG. 5. In FIG. 5, the signal values are normalized so as to provide the upper signal limit of "1.0". If light-quantity control coefficient calculator 121 determines the light-quantity control coefficient k according to the first method above, the light-quantity control coefficient k of this example has a value of 0.9. Therefore, the quantity of light passing through each of the light quantity adjusting devices 11, 12, 13 is decreased. On the other hand, the image signal corrector 111 multiplies each of the R, G, B input image signals by 1/0.9=10/9, so that the signal value is increased. As a result, histograms respectively plotting the corrected values of the R, G, B image signals are obtained as shown in the lower row of FIG. 5.

[1.4] Third Example of Driving System and Control System

In the above-described first example of the driving system and control system, the light-quantity control coefficient k calculated by the light-quantity control coefficient calculator 121 may also be corrected based on the external light illuminance and a light-quantity control coefficient k' thus corrected may be supplied to the light quantity controller 122.

Further in the above-described second example of the driving system and control system, the light-quantity control coefficient k calculated by the light-quantity control coefficient calculator 121 may also be corrected based on the external light illuminance and the light-quantity control coefficient k' thus corrected may be supplied to the light quantity controller 122 and the image signal corrector 111.

Figure 6:
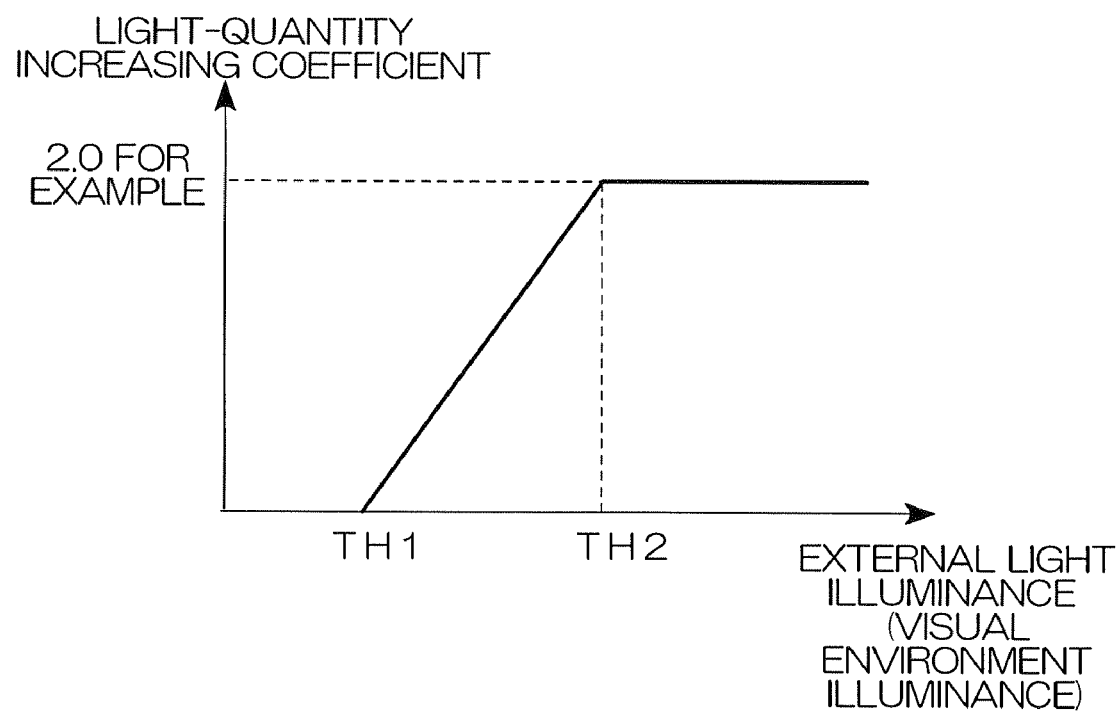
FIG. 6 is a graph showing a relation between the external light illuminance and the light-quantity increasing coefficient 'a'.

A correcting method for the light-quantity control coefficient k is described as below. Data representing a relation between the external light illuminance and the light-quantity increasing coefficient 'a' is previously obtained, as shown in FIG. 6. A light-quantity increasing coefficient 'a' is determined based on the data and the present external light illuminance. According to the example shown in FIG. 6, the light-quantity increasing coefficient 'a' has a value of 0 if the external illuminance is less than TH1. As the external illuminance increases from TH1 to less than TH2, the light-quantity increasing coefficient 'a' is accordingly increased from 0 to 2.0. If the external light illuminance is not less than TH2, the light-quantity increasing coefficient 'a' has the value of 2.0. The corrected light-quantity control coefficient k' (=a*k) is obtained by multiplying the light-quantity control coefficient k determined by the light-quantity control coefficient calculator 121 by the light-quantity increasing coefficient 'a' determined in the above-described manner. It is noted, however, that if the product of multiplying the light-quantity control coefficient k by the light-quantity increasing coefficient 'a' exceeds 1.0, the corrected light-quantity control coefficient k' is defined as 1.0.

The reason for correcting the light-quantity control coefficient k in this manner is as follows. As the external light illuminance is increased, the visibility is lowered. Therefore, the correction is made such that the decrease of light quantity attributable to the light quantity adjusting devices 11, 12, 13 is reduced if the external light illuminance is high.

[1.5] Fourth Example of Driving System and Control System

In the above-described first to third examples of the driving system and control system, respective display regions of the liquid crystal panels of the R, G, B liquid crystal light valves 21, 22, 23 are divided into plural blocks of the same number and of the same layout. As the light quantity adjusting devices 11, 12, 13, devices capable of adjusting the light quantity for each of the blocks of the respective display regions of the liquid crystal panels are used. These devices are divided into a plurality of portions, and each portion (hereinafter referred to as a "control unit") adjusts the light quantity of the corresponding block facing that portion. Such light quantity adjusting devices 11, 12, 13 may be fabricated by combining together a plurality of light quantity adjusting elements, for example. The respective control units of each of the light quantity adjusting devices 11, 12, 13 are controlled based on respective image signals for the blocks facing the control units.

This method provides the display of more-expressive images because the control of light quantity is provided for each of the plural blocks constituting one frame image.

In the first embodiment [1] above, the wavelength-selective polarization changing device capable of exclusively rotating the polarization of the light in the optional wavelength range is used as the light quantity adjusting device 11, 12, 13. Alternatively, a device simply adapted for transmittance variation, such as a liquid crystal shutter, may also be used.

[2] Second Embodiment

[2.1] General Configuration of Liquid Crystal Projector

Figure 7:
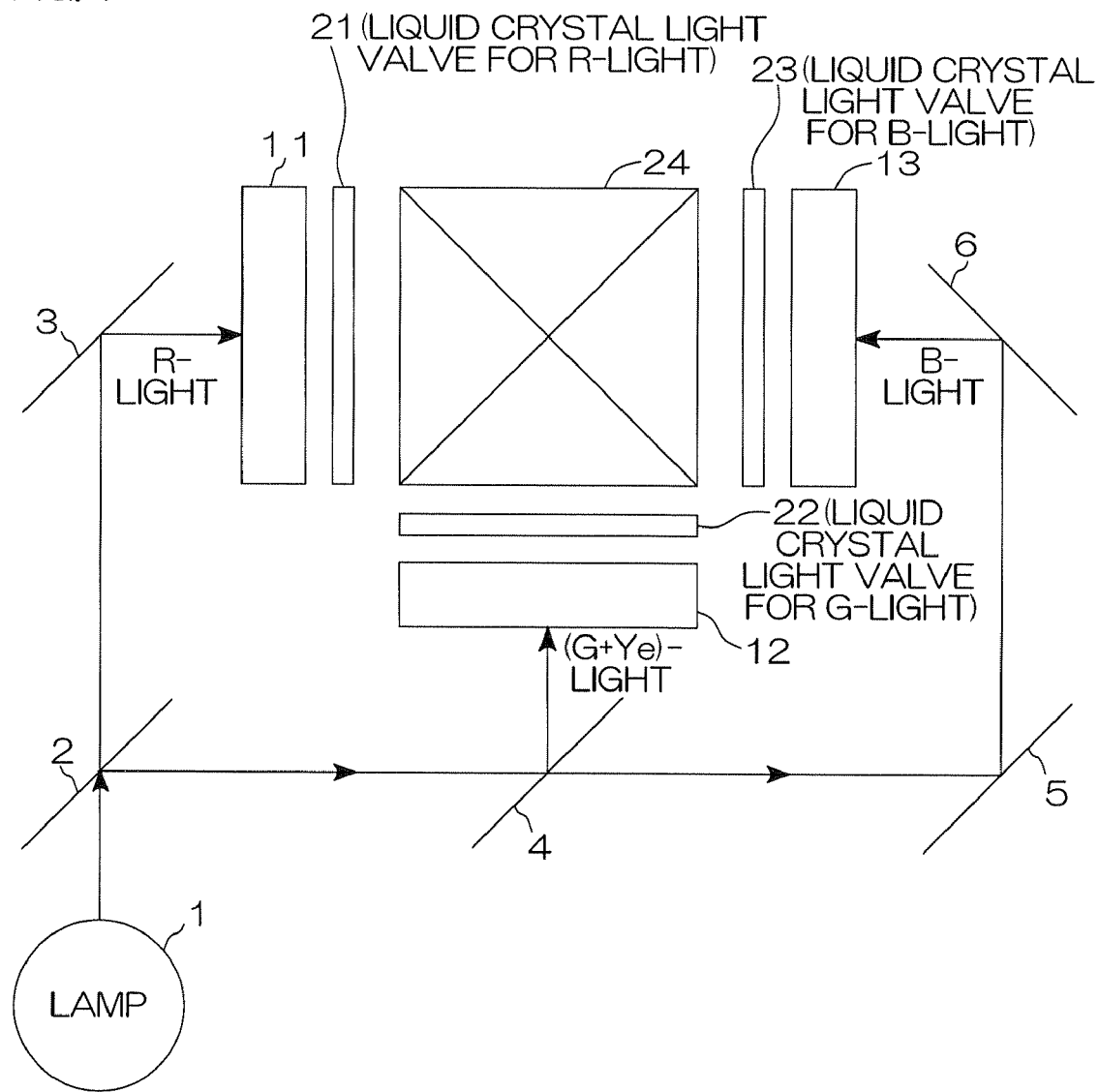
FIG. 7 is a schematic diagram showing a general configuration of a liquid crystal projector.

FIG. 7 schematically shows a general configuration of a liquid crystal projector. In FIG. 7, like reference numerals refer to the corresponding parts in FIG. 1.

The general configuration of this liquid crystal projector is substantially the same as that of the first embodiment [1] above, except for the following point. For higher luminance purpose, the light reflected by the second dichroic mirror 4 so as to become incident on the G-light quantity adjusting device 12 is allowed to include light in a yellow (Ye) wavelength band additionally to the light in the green (G) wavelength band. The use of the light in the yellow wavelength band is normally avoided because the color purity is lowered. It is noted however that the quantity of Ye-light is reduced in a case where the color purity is significantly lowered.

Figure 8:
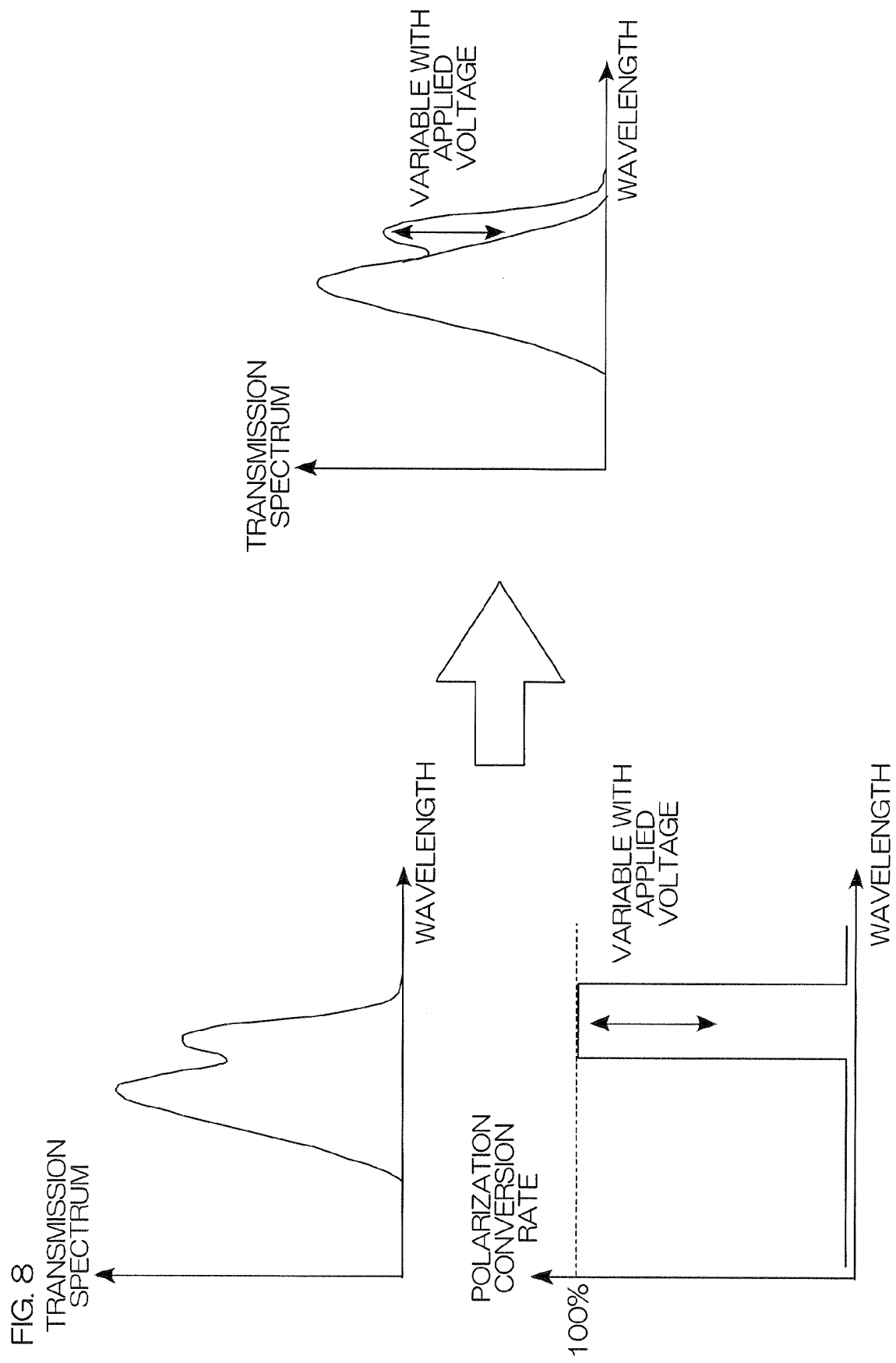
FIG. 8 is a group of graphs for explaining the characteristics of a G-light quantity adjusting device 12.

The G-light quantity adjusting device 12 is characterized by being transparent to the light in the green(G) wavelength band and the light in the yellow(Ye) wavelength band as shown in the upper left graph of FIG. 8. As shown in the lower left graph of FIG. 8, the G-light quantity adjusting device is capable of exclusively rotating the polarization of the light in the vicinity of the yellow(Ye) wavelength band. Accordingly, the transmission quantity of only the light in the vicinity of the yellow(Ye) wavelength band, out of the incident light, can be controlled by means of the voltage applied to the G-light quantity adjusting device.

The wavelength-selective polarization changing device, for example, is used as the light quantity adjusting device 11, 12, 13. In a case where the filter disclosed in FIG. 2 of Published Japanese Translation of PCT International Publication for Japanese Patent Application No. 2000-510961 is used as the G-light quantity adjusting device 12, for example, a spectrum F in FIG. 2 of the above publication No. 2000-510961 is equivalent to the yellow(Ye) light and a spectrum F(−) is equivalent to the green(G) light.

[2.2] Arrangement of Driving System and Control System

Figure 9:
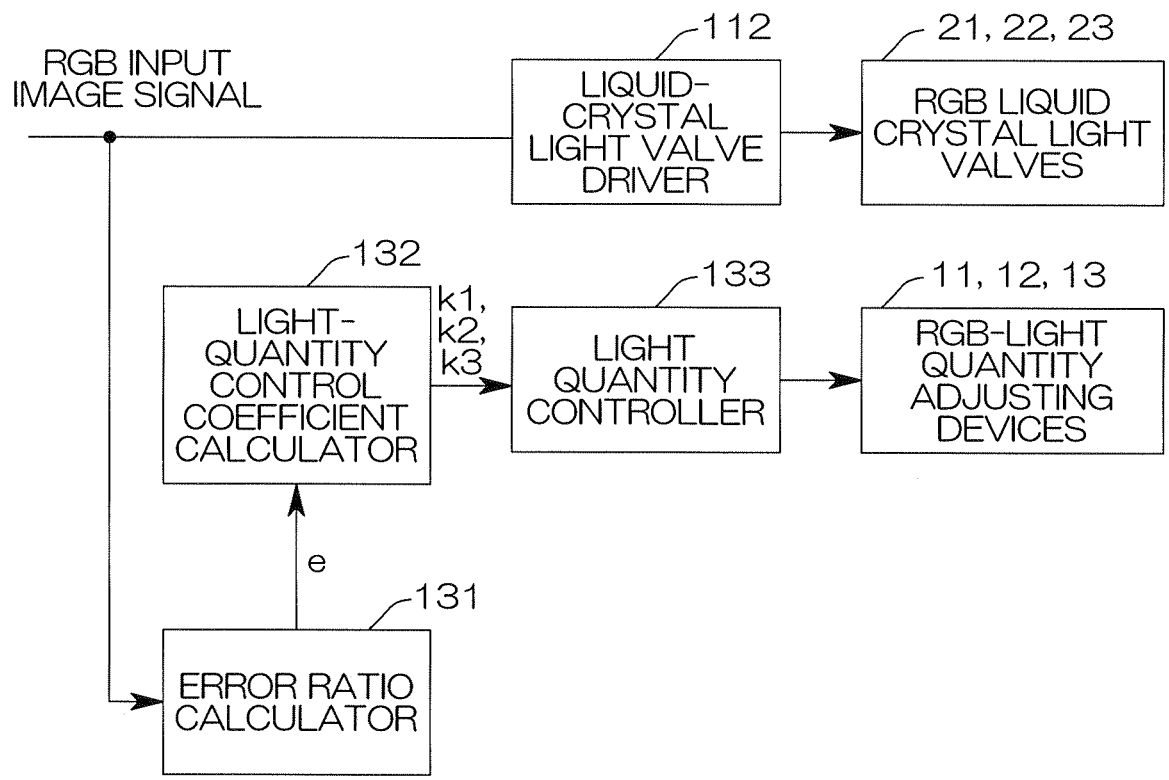
FIG. 9 is a block diagram showing a driving circuit of liquid crystal light valves and a control circuit of light quantity adjusting devices.

FIG. 9 shows a driving circuit of the liquid crystal light valves and a control circuit of the light quantity adjusting devices.

The RGB input image signal is supplied to the liquid-crystal light valve driver 112 as well as to an error ratio calculator 131. The liquid-crystal light valve driver 112 generates respective driving signals for the liquid crystal light valves 21, 22, 23 based on the RGB input image signal and outputs the resultant signals to the liquid crystal light valves 21, 22, 23.

The error ratio calculator 131 calculates an error ratio 'e' based on the RGB input image signal. The error ratio 'e' determined by the error ratio calculator 131 is supplied to a light-quantity control coefficient calculator 132. Based on the error ratio 'e', the light-quantity control coefficient calculator 132 calculates respective light-quantity control coefficients k1, k2, k3 for the light quantity adjusting devices 11, 12, 13. The light-quantity control coefficients k1, k2, k3 so determined by the light-quantity control coefficient calculator 132 are supplied to a light quantity controller 133.

The light quantity controller 133 controls the light quantity adjusting devices 11, 12, 13 based on the respective coefficients K1, k2, k3. Specifically, the R-light quantity adjusting device 11 is controlled so that the quantity of transmitted light through the R-light quantity adjusting device 11 is k1 time the quantity of incident light thereon. The B-light quantity adjusting device 13 is controlled so that the quantity of transmitted light through the B-light quantity adjusting device 13 is k3 time the quantity of incident light thereon. Further, the G-light quantity adjusting device 12 is controlled so that the quantity of light having wavelengths in the vicinity of the yellow (Ye) wavelength band and transmitted through the G-light quantity adjusting device 12 is k2 time the quantity of light having the wavelengths in the vicinity of the yellow (Ye) wavelength band and becoming incident thereon.

[2.2.1] Error Ratio Calculator 131

Now, description is made on a method of calculating the error ratio 'e' which is performed by the error ratio calculator 131.

Figure 10:
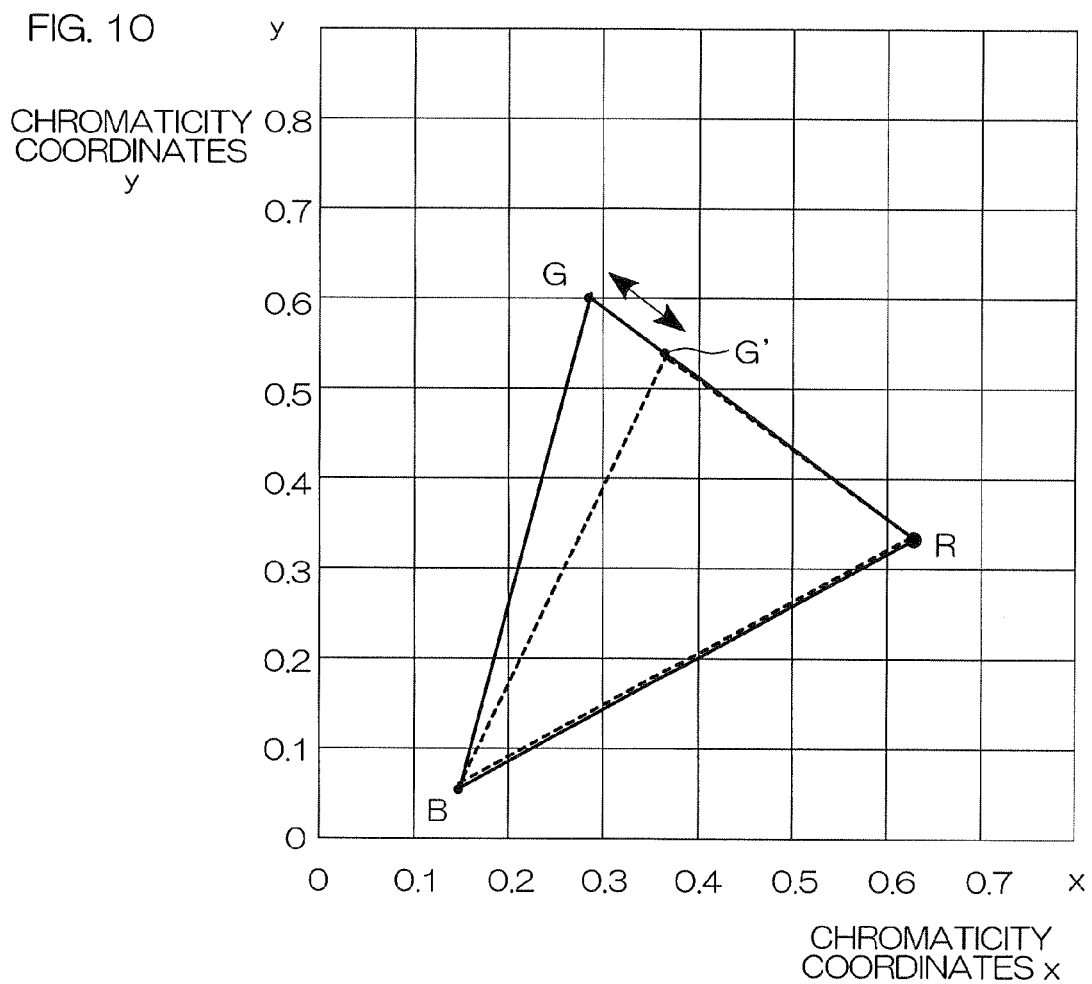
FIG. 10 is an xy chromaticity diagram showing a color gamut of a liquid crystal projector in which a Ye-light is not superimposed on a G-light incident on a liquid crystal light valve for G-light 22 and a color gamut of the liquid crystal projector in which the Ye-light is superimposed on the G-light incident on the liquid crystal light valve for G-light 22.

In FIG. 10, the solid line indicates a color gamut of a liquid crystal projector when the Ye-light is not superimposed on the G-light incident on the liquid crystal light valve for G-light 22. If the Ye-light is superimposed on the G-light incident on the liquid crystal light valve for G-light 22, the color gamut is narrowed as indicated by the broken line in FIG. 10. The color gamut is narrowed more as the quantity of superimposed Ye-light is increased.

The superimposition of the Ye-light may sometimes disable the reproduction of a color which can be reproduced in the original color gamut. In one frame image, the error ratio is defined by the value given by dividing the number of pixels outside the color gamut of the light superimposed with the Ye-light by the total number of pixels. The color gamut of the light superimposed with the Ye-light means a color gamut provided when the quantity of transmitted Ye-light is not limited by the G-light quantity adjusting device 12, namely the region indicated by the broken line in FIG. 10.

The color gamut indicated by the solid line in FIG. 10 can be determined by taking measurements on the chromaticities of the R, G, B colors discretely displayed (R, G, B chromaticity coordinates) when the Ye-light is not superimposed on the incident light (or when the Ye-light is blocked). The color gamut indicated by the broken line in FIG. 10 can be determined by taking measurements on the chromaticities of the R, G, B colors discretely displayed when the Ye-light is superimposed on the incident light (or when the quantity of transmitted Ye-light is not limited). Specifically, the chromaticity coordinates of G' color shown in FIG. 10 can be obtained by taking measurements on the chromaticity of G color when only the G color is displayed using the Ye-light superimposed on the incident light.

The error ratio calculator 131 first performs calculation on a per-frame basis for determining chromaticity coordinate values x, y of each pixel in correspondence to input signal values thereof. Subsequently, the calculator determines the number of pixels having the chromaticity coordinate values (x, y) outside the color gamut (a triangular region having vertices G, G', B in FIG. 10) provided when the Ye-light is superimposed on the incident light. The calculator determines the error ratio 'e' by dividing the resultant number of pixels by the total number of pixels.

Figure 11:
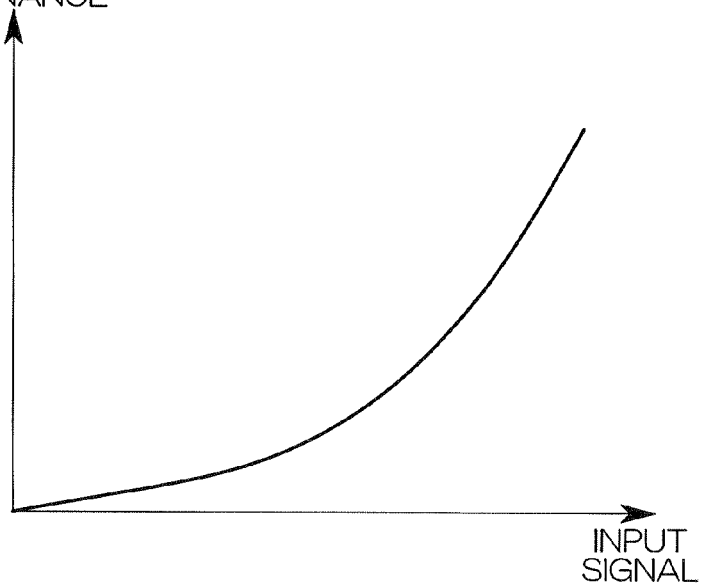
FIG. 11 is a graph showing a relation between the input signal for a certain color and the luminance.

The chromaticity coordinate values x, y corresponding to the input signal values of a target pixel are calculated as follows. It is assumed that the input signal values of the target pixel are expressed as Rin, Gin, Bin. A relation between the input signal and the luminance of each of the R, G, B colors is previously determined based on the γ characteristic of each of the liquid crystal light valves 21, 22, 23. FIG. 11 shows a relation between the input signal and the luminance of a certain color. Based on the relations between the input signal and the luminance previously determined for the respective R, G, B colors, respective luminances Lr, Lg, Lb are determined in correspondence to the input signal values Rin, Gin, Bin of the target pixel.

Assumed that the chromaticity coordinates of R color in FIG. 10 are expressed as xr, yr, the chromaticity coordinates of G color are expressed as xg, yg and the chromaticity coordinates of B color are expressed as xb, yb, the chromaticity coordinate values x, y corresponding to the input signal values Rin, Gin, Bin of the target pixel are determined from the following equations (1).

$$x = \frac{\left\{\left(\frac{xr}{yr}\right) \cdot Lr\right\} + \left\{\left(\frac{xg}{yg}\right) \cdot Lg\right\} + \left\{\left(\frac{xb}{yb}\right) \cdot Lb\right\}}{\left(\frac{Lr}{yr}\right) + \left(\frac{Lg}{yg}\right) + \left(\frac{Lb}{yb}\right)}$$

$$y = \frac{Lr + Lg + Lb}{\left(\frac{Lr}{yr}\right) + \left(\frac{Lg}{yg}\right) + \left(\frac{Lb}{yb}\right)}$$

[2.2.2] Light-Quantity Control Coefficient Calculator 132

Based on the error ratio 'e', the light-quantity control coefficient calculator 132 calculates the respective light-quantity control coefficients k1, k2, k3 for the light quantity adjusting devices 11, 12, 13.

Figure 12:
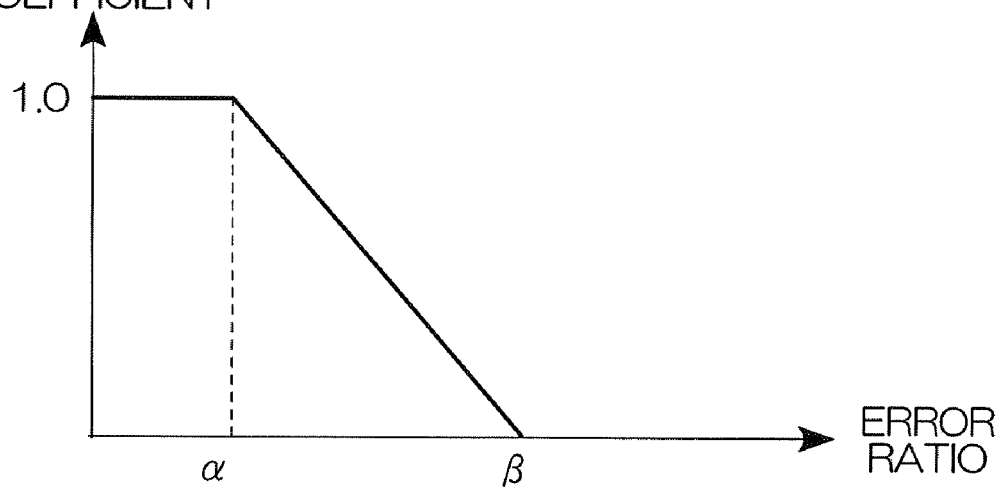
FIG. 12 is a graph showing a relation between the error ratio 'e' and the coefficient k2.

The light-quantity control coefficient k2 for G-light is determined based on previously obtained data representing a relation between the error ratio 'e' and the coefficient k2, as shown in FIG. 12. According to the example shown in FIG. 12, the coefficient K2 takes a value of 1.0 if the error ratio 'e' is less than a predetermined value α. As the error ratio 'e' increases from the predetermined value α to less than a predetermined value β, the coefficient K2 is accordingly decreased from 1.0 to 0. The coefficient K2 takes a value of 0 if the error ratio 'e' is not less than the predetermined value β.

In the case of a small error ratio 'e', the reduction of the Ye-light is not needed so much because a small number of color pixels are outside the color gamut provided when the Ye-light is superimposed on the incident light. Hence, the coefficient K2 is defined as K2=1.0. As the error ratio 'e' increases, K2 is decreased in value such that the quantity of the Ye-light may be decreased.

Figure 13:
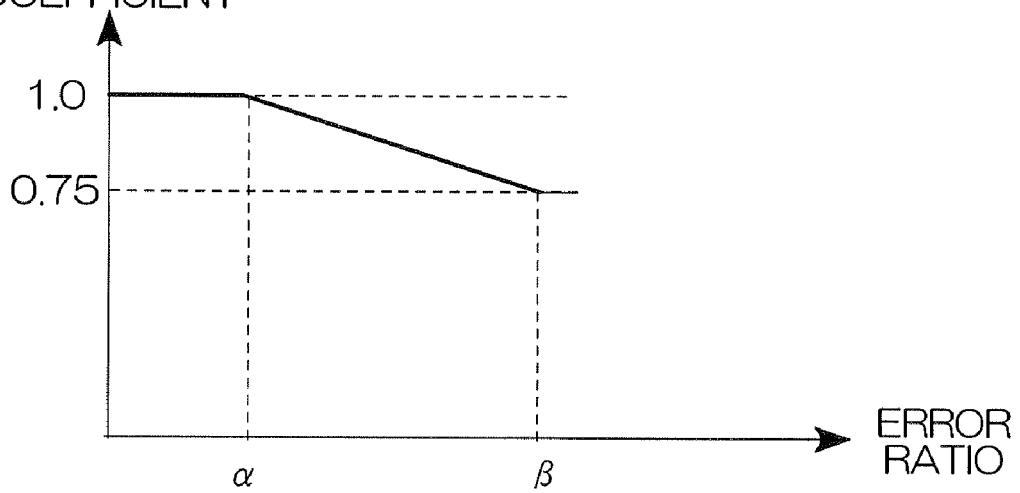
FIG. 13 is a graph showing a relation between the error ratio 'e' and the coefficient k1 (or k3)

The light-quantity control coefficient k1 for R-light or the light-quantity control coefficient k3 for B-light is determined based on previously obtained data representing a relation between the error ratio 'e' and the coefficient k1 (or k3), as shown in FIG. 13. According to the example shown in FIG. 13, the coefficient K1 (or K3) takes a value of 1.0 if the error ratio 'e' is less than the predetermined value α. As the error ratio 'e' increases from the predetermined value α to less than the predetermined value β, the coefficient K1 (or K3) is accordingly decreased from 1.0 to 0.75. The coefficient K1 (or K3) takes the value of 0.75 if the error ratio 'e' is not less than the predetermined value β.

The G-light quantity adjusting device 12 has a function to reduce the Ye-light of the (G+Ye) light incident thereon according to the input image signal. Therefore, the maximum quantity of light transmitted through the G-light quantity adjusting device 12 is the sum (G+Ye) of the total quantity of G-incident light and the total quantity of Ye-incident light. The minimum quantity of light transmitted through the G-light quantity adjusting device 12 is the total quantity of G-incident light. This example defines a ratio between the total quantity of G-incident light and the total quantity of Ye-incident light to be 3:1. Assumed that the maximum value of output light from the G-light quantity adjusting device 12 is at 1.0, the minimum value thereof is at 0.75. Hence, the relation between the error ratio 'e' and the coefficient k1 (or k3) is defined as that shown in FIG. 13 such that the light decreasing rate of the G-light quantity adjusting device 12 may be matched with the light decreasing rate of the R, B-light quantity adjusting device 11, 13.

[3] Third Embodiment

[3.1] General Configuration of Liquid Crystal Projector

Figure 14:
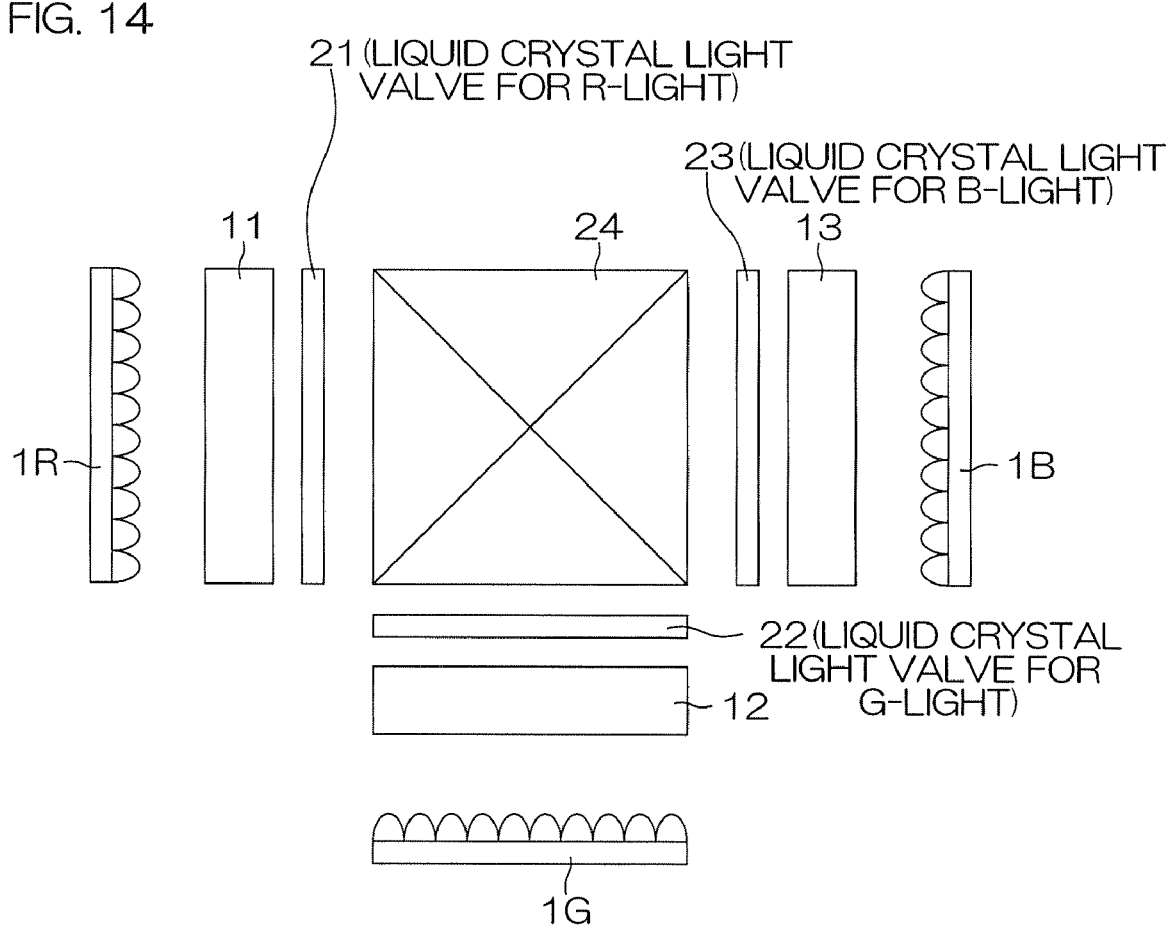
FIG. 14 is a schematic diagram showing a general configuration of a liquid crystal projector.

FIG. 14 schematically shows a general configuration of a liquid crystal projector. In FIG. 14, like reference numerals refer to the corresponding parts in FIG. 1.

The general configuration of this liquid crystal projector is substantially the same as that of the first embodiment [1] above, except for the following point. For improving color reproduction performance, the projector comprises a red laser light source 1R, a green laser light source 1G and a blue laser light source 1B in place of the lamp 1. Each of the laser light sources 1R, 1G, 1B of the individual colors has a configuration wherein a plurality of semiconductor lasers as solid-state light emitting devices are two-dimensionally arranged (in an array pattern) so as to output light polarized in the same direction.

In this embodiment, the lamp 1 presenting luminous energy distribution across the visible light region is replaced by the laser light sources 1R, 1G, 1B having peaked luminous energies at predetermined wavelengths of three primary colors. Therefore, the laser light sources 1R, 1G, 1B may be arranged in a manner that light from each of the laser light sources 1R, 1G, 1B is irradiated on the overall surface of each corresponding light quantity adjusting device 11, 12, 13. Thus, the embodiment obviates the need for the dichroic mirrors 2, 4 employed by the first embodiment.

The light quantity adjusting device 11, 12, 13 has the characteristic of rotating the polarization of light in a particular wavelength region. Specifically, the light quantity adjusting device comprises two retarder stacks and a modulator sandwiched therebetween. The device is capable of rotating the polarization of the light in the particular wavelength region in the range of 0° to 90° by varying the voltage applied to the modulator.

Therefore, the light outputted from the respective laser light sources 1R, 1G, 1B is subjected to polarization rotated by the respective light quantity adjusting devices 11, 12, 13, before becoming incident on the respective liquid crystal light valves 21, 22, 23. The liquid crystal light valves 21, 22, 23 each comprise the incident-side polarizer and the output-side polarizer not shown. The light the polarization of which is rotated by the light quantity adjusting device 11, 12, 13 is varied in the transmittance depending upon the polarized direction when the light becomes incident on the incident-side polarizer of the liquid crystal light valve 21, 22, 23. Thus is controlled the quantity of light becoming incident on the liquid crystal light valve 21, 22, 23.

Figure 15:
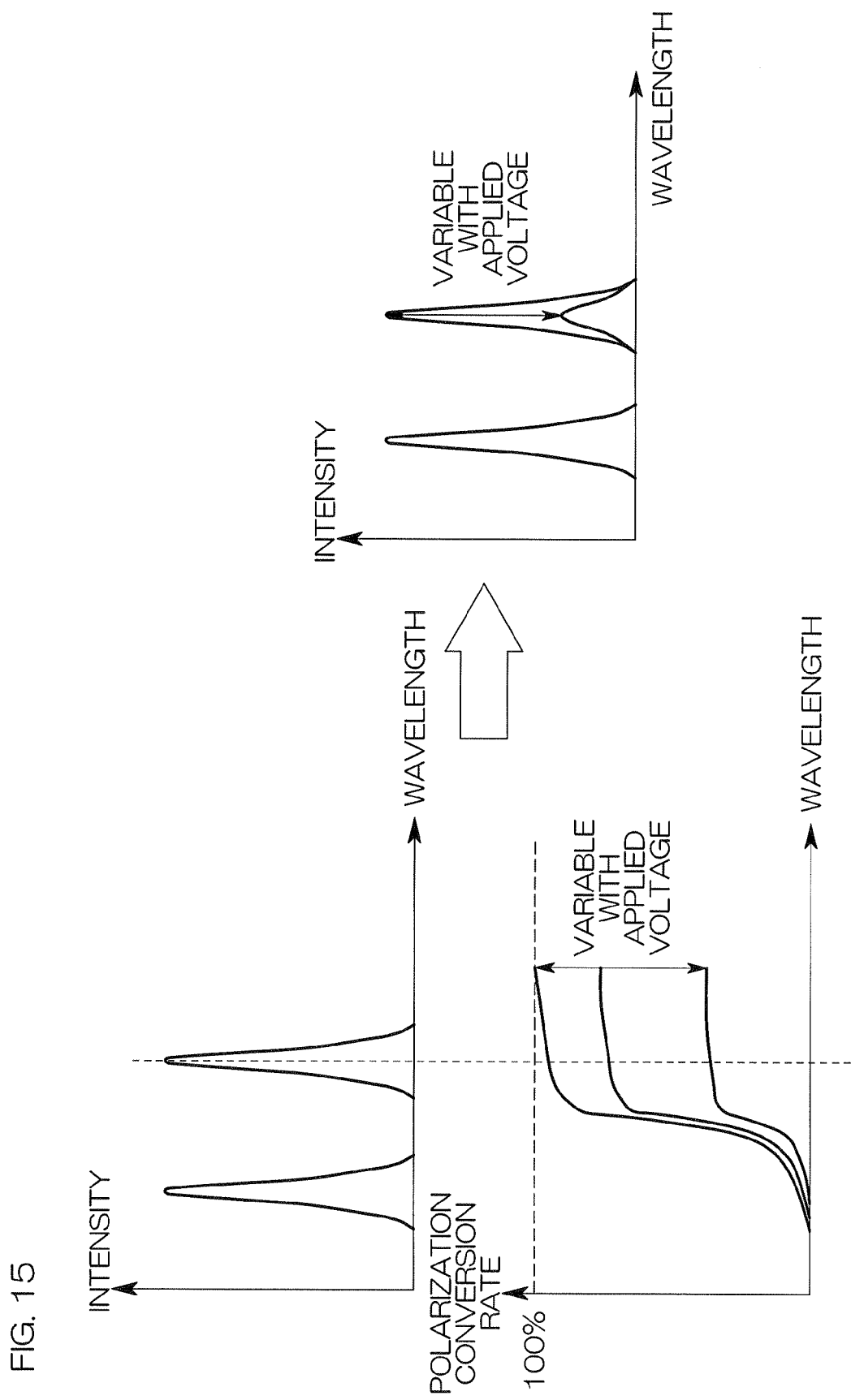
FIG. 15 is a group of graphs for explaining the characteristics of an R-light quantity adjusting device.

Description is made by way of example of a red light. The red laser light source 1R comprises a combination of a first solid-state light emitting device (semiconductor laser) outputting a red laser light having a short wavelength and a second solid-state light emitting device (semiconductor laser) outputting a red laser light having a long wavelength, as shown in the upper left graph of FIG. 15. In a case where such a red laser light source 1R is used, the R-light quantity adjusting device 11 employs, for example, a device capable rotating the polarization of only the red light having the long wavelength, as shown in the lower left graph of FIG. 15. In this case, the R-light quantity adjusting device 11 can control the transmittance of only the red light on the longer wavelength side in the incident light thereon by varying the voltage applied thereto.

[3.2] Arrangement of Driving System and Control System

The embodiment may employ the same driving circuit of the liquid crystal light valve and the same control circuit of the light quantity adjusting device as those of the first embodiment [1] above.

[4] Fourth Embodiment

[4.1] General Configuration of DMD Projector

Figure 16:
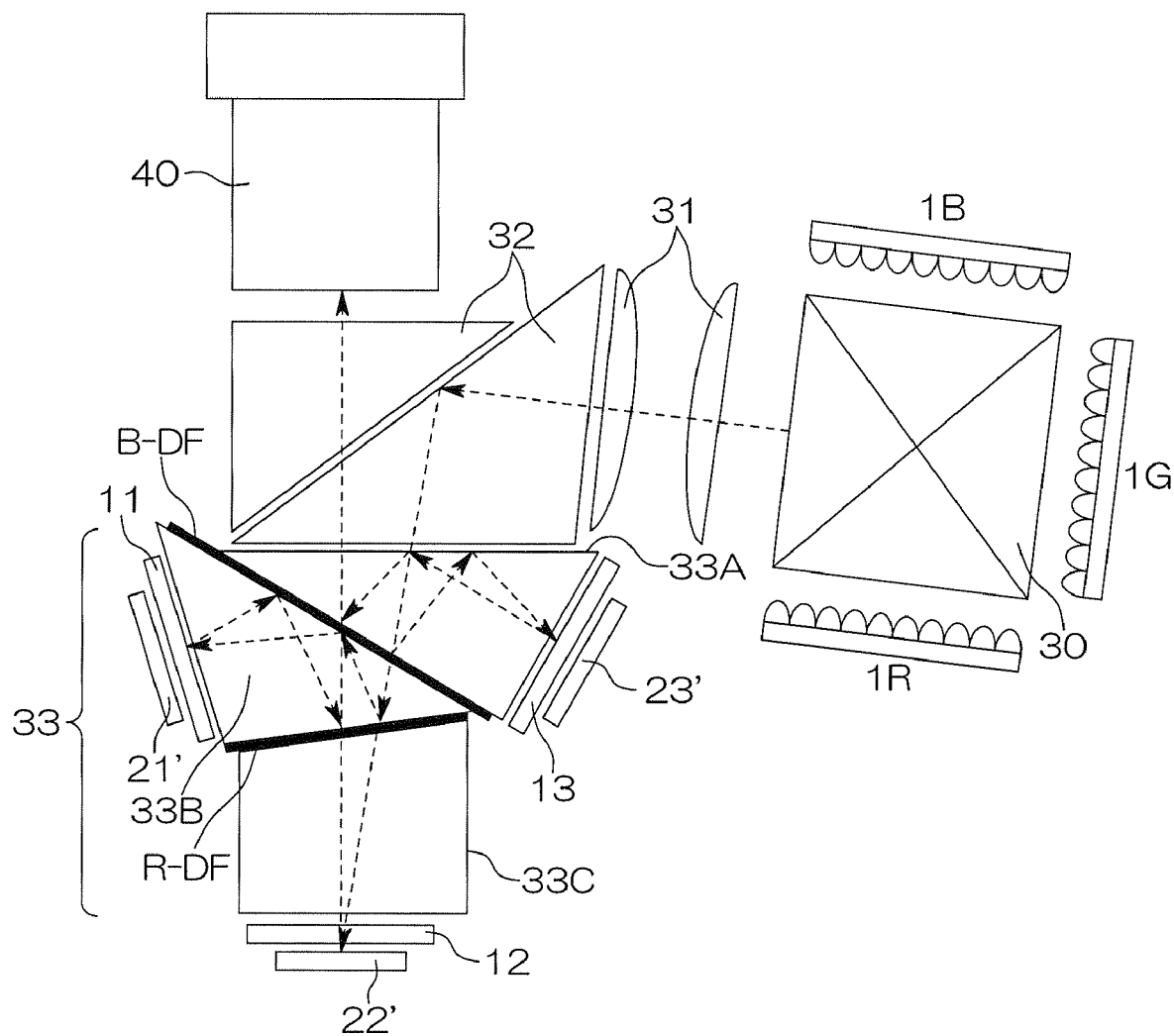
FIG. 16 is a schematic diagram showing a general configuration of a DMD projector.

FIG. 16 schematically shows a general configuration of a DMD (Digital Micromirror Device) projector. In FIG. 16, like reference numerals refer to the corresponding parts in FIG. 1.

For improving the color reproduction performance, the DMD projector comprises the red laser light source 1R, the green laser light source 1G and the blue laser light source 1B in place of the lamp 1, just as in the third embodiment [3] above. The light beams outputted from the respective laser light sources 1R, 1G, 1B are combined into a white light by a dichroic prism 30. The resultant white light is guided to a total internal reflection (TIR) prism 32 via a lens 31. The white light is reflected by the TIR prism 32 so as to be guided to a color separation prism 33, which comprises three prisms 33A, 33B, 33C.

A B-light of the white light incident on the prism 33A is reflected by a surface of a B-dichroic filter (B-DF) disposed on an output side of the prism 33A, while R-light and G-light of the white light become incident on the prism 33B. The R-light of the R- and G-light incident on the prism 33B is reflected by a surface of an R-dichroic filter (R-DF) disposed on an output side of the prism 33B, while the G-light becomes incident on the prism 33C.

The B-light reflected by the surface of the B-dichroic filter (B-DF) undergoes total internal reflection at an air gap surface defining a boundary surface between the prism 33A and the TIR prism 32, becoming incident on a blue DMD device 23' as a B-light modulating device where the B-light is modulated according to a B-light image signal.

The R-light reflected by the surface of the R-dichroic filter (R-DF) undergoes total internal reflection at an air gap surface defining a boundary surface between the prism 33B and the prism 33A, becoming incident on a red DMD device 21' as an R-light modulating device where the R-light is modulated according to an R-light image signal. The G-light incident on the prism 33C becomes incident on a green DMD device 22' as a G-light modulating device where the G-light is modulated according to a G-light image signal.

The red DMD device 21', green DMD device 22' and blue DMD device 23' are reflective light modulating devices which output the modulated light as a reflected light.

In this embodiment, the light quantity adjusting devices 11, 12, 13 for adjusting the quantity of light in the particular wavelength region are interposed between the red DMD device 21', green DMD device 22' and blue DMD device 23' and the prism 33B, prism 33C and prism 33A, respectively. The light quantity adjusting devices 11, 12, 13 may be controlled using the same method as that used in the first embodiment [1] above.

The modulated G-light so modulated by the green DMD device 22' is guided to a projection lens 40 through the prisms 33C, 33B, 33A and the TIR prism 32. The modulated R-light so modulated by the red DMD device 21' undergoes the total internal reflection at the air gap surface as the boundary surface between the prism 33A and the prism 33B and then is reflected by the surface of the R-dichroic filter (R-DF) so as to be guided to the projection lens 40 through the prisms 33B, 33A and the TIR prism 32.

The modulated B-light so modulated by the blue DMD device 23' undergoes the total internal reflection at the air gap surface as the boundary surface between the TIR prism 32 and the prism 33A and then is reflected by the surface of the B-dichroic filter (B-DF) so as to be guided to the projection lens 40 through the prism 33A and the TIR prism 32.

What is claimed is:

1. A projection display device which includes a light source for outputting light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, comprising:
   three light quantity adjusting devices disposed on respective incidence sides of the light modulating devices and serving to adjust the quantity of light incident on the respective light modulating devices; and
   a controller unit for controlling the respective light quantity adjusting devices based on the respective input signals, the controller unit comprising:
   a first unit for calculating a light-quantity control coefficient by dividing the maximum value of the respective input signal values by the maximum value that the respective input signals can take on a per frame basis; and
   a second unit for controlling the respective light quantity adjusting devices for making the quantity of light passing through each of the light quantity adjusting devices equal to a value determined by multiplying the quantity of the incident light by the light-quantity control coefficient.

2. A projection display device which includes a light source for outputting a white light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, and in which any one of the first-color light, the second-color light and the third-color light is superimposed with a fourth-color light and is made incident on a corresponding one of the first-color light modulating device, the second-color light modulating device and the third-color light modulating device,
   the projection display device comprising:
   a light quantity adjusting device disposed on an incidence side of the light modulating device for the fourth-color light to enter and serving to adjust the quantity of the fourth-color light; and
   a controller unit for controlling the light quantity adjusting device,
   wherein the controller unit performs calculation on a per-frame basis for determining, as an error ratio, a ratio of pixels outside a color gamut provided when the quantity of the fourth-color light is not limited, and controls the light quantity adjusting device based on the error ratio thus determined.

3. The projection display device according to claim 2, wherein if the error ratio is less than a predetermined threshold value, the controller unit controls the light quantity adjusting device in a manner not to decrease the quantity of the fourth-color light.

4. The projection display device according to claim 2, wherein if the error ratio is not less than a predetermined threshold value, the controller unit controls the light quantity adjusting device in a manner that the quantity of the fourth-color light is decreased more with the increase of the error ratio.

5. A projection display device which includes a light source for outputting light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, comprising:
   three light quantity adjusting devices disposed on respective incidence sides of the light modulating devices and serving to adjust the quantity of light incident on the respective light modulating devices; and
   a controller unit for controlling the respective light quantity adjusting devices based on the respective input signals, the controller unit comprising:
   a first unit for extracting respective signal values corresponding to a predetermined pixel number from one having the smallest signal value for the input signals on a per frame basis and selecting the maximum value of the extracted signal values;
   a second unit for determining a value equivalent to a value determined by dividing the maximum value selected by the first unit by the maximum value that the respective input signals can take, as a light-quantity control coefficient; and
   a third unit for controlling the respective light quantity adjusting devices for making the quantity of light passing through each of the light quantity adjusting devices equal to a value determined by multiplying the quantity of the incident light by the light-quantity control coefficient.

6. A projection display device which includes a light source for outputting light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, comprising:
   three light quantity adjusting devices disposed on respective incidence sides of the light modulating devices and serving to adjust the quantity of light incident on the respective light modulating devices; and
   a controller unit for controlling the respective light quantity adjusting devices based on the respective input signals, the controller unit comprising:
   a first unit for calculating a light-quantity control coefficient by dividing the maximum value of the respective input signal values by the maximum value that the respective input signals can take on a per frame basis;
   a second unit for correcting the light-quantity control coefficient calculated by the first unit based on the external light illuminance; and
   a third unit for controlling the respective light quantity adjusting devices for making the quantity of light passing through each of the light quantity adjusting devices equal to a value determined by multiplying the quantity of the incident light by the light-quantity control coefficient corrected by the second unit.

7. A projection display device which includes a light source for outputting light, a first-color light modulating device for modulating the light from the light source based on a first-color input signal, a second-color light modulating device for modulating the light from the light source based on a second-color input signal, and a third-color light modulating device for modulating the light from the light source based on a third-color input signal, comprising:

three light quantity adjusting devices disposed on respective incidence sides of the light modulating devices and serving to adjust the quantity of light incident on the respective light modulating devices; and a controller unit for controlling the respective light quantity adjusting devices based on the respective input signals, the controller unit comprising:

a first unit for extracting the respective signal values corresponding to a predetermined pixel number from one having the smallest signal value for the input signals on a per frame basis and selecting the maximum value of the extracted signal values;

a second unit for determining a value equivalent to a value determined by dividing the maximum value selected by the first unit by the maximum value that the respective input signals can take, as a light-quantity control coefficient;

a third unit for correcting the light-quantity control coefficient calculated by the second unit based on the external light illuminance; and a fourth unit for controlling the respective light quantity adjusting devices for making the quantity of light passing through each of the light quantity adjusting devices equal to a value determined by multiplying the quantity of the incident light by the light-quantity control coefficient corrected by the third unit.

8. The projection display device according to any one of claims 1 and 5-7 further comprising a signal correction unit for correcting a signal outputted to the light modulating device in a manner to compensate for a decrease of light quantity attributable to the light quantity adjusting device.

9. The projection display device according to any one of claims 1 and 5-7, wherein each of the light quantity adjusting devices is divided into plural blocks and the light quantity is adjusted for each display region of the light modulating device that corresponds to each of the blocks.

10. The projection display device according to any one of claims 1 and 5-7, wherein the light source includes a red laser light source for outputting a red laser light, a green laser light source for outputting a green laser light, and a blue laser light source for outputting a blue laser light.

11. The projection display device according to any one of claims 1 and 5-7, wherein each of the light modulating devices is a reflective light modulating device which outputs a modulated light as a reflective light.

* * * * *